US012207048B2

(12) United States Patent
Voishvillo

(10) Patent No.: US 12,207,048 B2
(45) Date of Patent: Jan. 21, 2025

(54) OMNIDIRECTIONAL LOUDSPEAKER AND COMPRESSION DRIVER THEREFOR

(71) Applicant: HARMAN INTERNATIONAL INDUSTRIES, INCORPORATED, Stamford, CT (US)

(72) Inventor: Alexander Voishvillo, Simi Valley, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/766,988

(22) PCT Filed: Oct. 10, 2019

(86) PCT No.: PCT/US2019/055527
§ 371 (c)(1),
(2) Date: Apr. 6, 2022

(87) PCT Pub. No.: WO2021/071488
PCT Pub. Date: Apr. 15, 2021

(65) Prior Publication Data
US 2024/0080616 A1 Mar. 7, 2024

(51) Int. Cl.
*H04R 1/34* (2006.01)
*H04R 1/40* (2006.01)

(52) U.S. Cl.
CPC ............ *H04R 1/345* (2013.01); *H04R 1/403* (2013.01); *H04R 2201/34* (2013.01); *H04R 2400/13* (2013.01)

(58) Field of Classification Search
CPC .... H04R 2201/34; H04R 1/403; H04R 1/345; H04R 2400/13
See application file for complete search history.

(56) References Cited

U.S. PATENT DOCUMENTS 4,134,471 A 1/1979 Queen
4,496,021 A 1/1985 Berlant
(Continued)

FOREIGN PATENT DOCUMENTS

CN 106470372 A 3/2017
CN 108605182 A 9/2018
(Continued)

OTHER PUBLICATIONS

European Office Action for Application No. 19 797 875.2, dated May 27, 2024, 10 pages.
(Continued)

*Primary Examiner* — Kile O Blair
(74) *Attorney, Agent, or Firm* — Brooks Kushman P.C.

(57) ABSTRACT

An omnidirectional loudspeaker includes a lower horn member having a generally convex, upwardly-facing outer wall, an upper horn member spaced from the lower horn member and having a generally convex, downwardly-facing outer wall, and at least one compression driver connected to one of the lower or upper horn members along a central axis. The at least one compression driver includes a magnet assembly, a diaphragm operably connected to the magnet assembly, a phasing plug adjacent the diaphragm, and a compression chamber defined between the diaphragm and the phasing plug. The lower and upper horn members are coupled via the at least one compression driver in spaced relationship along the central axis to define a passageway for radiating sound waves generated by the compression driver in a generally horizontal 360° radiation pattern.

20 Claims, 6 Drawing Sheets

(56) References Cited

U.S. PATENT DOCUMENTS

| | | | |
|---|---|---|---|
| 4,908,601 | A | 3/1990 | Howze |
| 5,253,301 | A | 10/1993 | Sakamoto et al. |
| 5,359,158 | A | 10/1994 | Queen |
| 8,469,140 | B1 | 6/2013 | Graber |
| 8,670,585 | B2 | 3/2014 | Valtchev et al. |
| 9,245,513 | B1 | 1/2016 | Dimitrov |
| 2008/0192972 | A1 | 8/2008 | Lewallen |
| 2013/0228393 | A1 | 9/2013 | Sterling et al. |
| 2015/0319515 | A1 | 11/2015 | Devantier et al. |
| 2016/0309257 | A1 | 10/2016 | Liu et al. |
| 2018/0054671 | A1 | 2/2018 | Voishvillo |
| 2019/0174224 | A1 | 6/2019 | Chen |
| 2019/0222925 | A1 | 7/2019 | Ha et al. |

FOREIGN PATENT DOCUMENTS

| | | | |
|---|---|---|---|
| CN | 109565628 | A | 4/2019 |
| CN | 109889960 | A | 6/2019 |
| WO | 2021071488 | A1 | 4/2021 |

OTHER PUBLICATIONS

International Search Report for PCT/US2019/055527, Prepared by the European Patent Office, mailing date Jun. 24, 2020, 6 pages.
International Preliminary Report on Patentability for PCT Application No. PCT/US2019/055527, dated Apr. 12, 2022, 15 pages.
International Search Report and Written Opinion for Application No. PCT/US2020/062459, dated Jul. 28, 2021, 19 pages.
International Preliminary Report on Patentability for Application No. PCT/US2020/062459, dated Jun. 8, 2023, 14 pages.
Chinese Office Action with English translation for Application No. 201980101221.9, dated Jul. 31, 2024, 16 pages.

OMNIDIRECTIONAL LOUDSPEAKER AND COMPRESSION DRIVER THEREFOR

CROSS-REFERENCE TO RELATED APPLICATION

This application is the U.S. national phase of PCT Application No. PCT/US2019/055527 filed on Oct. 10, 2019, the disclosure of which is incorporated in its entirety by reference herein.

TECHNICAL FIELD

Embodiments relate to an omnidirectional loudspeaker and a compression driver for use in an omnidirectional loudspeaker.

BACKGROUND

An ideal omnidirectional speaker radiates sound similarly in all directions and, from an acoustical standpoint, behaves like a pulsating sphere. Typically, in practical applications, the omnidirectionality is provided in a horizontal plane. Omnidirectional transducers and loudspeaker systems incorporating them are used for various applications such as Hi-Fi loudspeakers, alarm systems, and landscape loudspeaker systems.

Typical omnidirectional speaker systems include direct-radiating transducers having conical or dome diaphragms with corresponding “diffusers” which spread sound waves in an omnidirectional manner. The transducers are oriented in such a way that the diaphragm axis is oriented vertically, such that the sound radiation is converted to distribution in a horizontal plane. Unfortunately, direct-radiating transducers have a low efficiency, maximally a few percent. This limits the efficiency, sensitivity, and maximum sound pressure level of transducers and loudspeaker systems providing omnidirectional radiation. Furthermore, prior horn systems used for omnidirectional purposes typically include arrays of directional horns, and these systems have regions of cancellation between individual horns that result in non-uniform coverage patterns and degraded performance.

SUMMARY

In one or more embodiments, a compression driver for an omnidirectional loudspeaker includes a magnet assembly disposed about a central axis and a diaphragm disposed coaxially above and operably connected to the magnet assembly. The compression driver further includes phasing plug including a base portion having a first side and an opposed second side facing the diaphragm, the base portion including a plurality of apertures that extend therethrough and are arranged generally circumferentially about the central axis. The phasing plug includes a raised portion extending upwardly from the base portion and defining a plurality of radially-expanding channels acoustically connected to the apertures. A compression chamber is defined between the diaphragm and the phasing plug, wherein actuation of the diaphragm by the magnet assembly generates sound waves within the compression chamber which travel through the plurality of apertures and the radially-expanding channels to create a generally horizontal 360° radiation pattern of the sound waves from the compression driver.

In one or more embodiments, an omnidirectional loudspeaker includes a lower horn member having a generally convex, upwardly-facing outer wall, an upper horn member spaced from the lower horn member and having a generally convex, downwardly-facing outer wall, and at least one compression driver connected to one of the lower or upper horn members along a central axis. The at least one compression driver includes a magnet assembly, a diaphragm operably connected to the magnet assembly, a phasing plug adjacent the diaphragm, and a compression chamber defined between the diaphragm and the phasing plug. The lower and upper horn members are coupled via the at least one compression driver in spaced relationship along the central axis to define a passageway for radiating sound waves generated by the compression driver in a generally horizontal 360° radiation pattern.

In one or more embodiments, a speaker array includes a plurality of omnidirectional loudspeakers, each omnidirectional loudspeaker including a lower horn member having a generally convex, upwardly-facing outer wall with a circumferential edge, and an upper horn member spaced from the lower horn member and having a generally convex, downwardly-facing outer wall with a circumferential edge. Each omnidirectional loudspeaker further includes at least one compression driver connected to one of the lower or upper horn members along a central axis and including a magnet assembly, a diaphragm operably connected to the magnet assembly, a phasing plug adjacent the diaphragm, and a compression chamber defined between the diaphragm and the phasing plug. The lower and upper horn members are coupled via the at least one compression driver in spaced relationship along the central axis to define a passageway for radiating sound waves generated by the compression driver in a generally horizontal 360° radiation pattern, and adjacent omnidirectional loudspeakers are assembled via the circumferential edges of the lower and upper horn members to form the speaker array.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In one or more embodiments, an omnidirectional loudspeaker is disclosed which utilizes a compression driver for efficiently and effectively generating sound in a generally horizontal 360° radiation pattern. As compared with direct-radiating dome speakers, use of compression driver in the omnidirectional loudspeaker disclosed herein results in a ten-fold increase in efficiency and sensitivity, as well as an increase in maximum sound pressure level.

Figure 1:
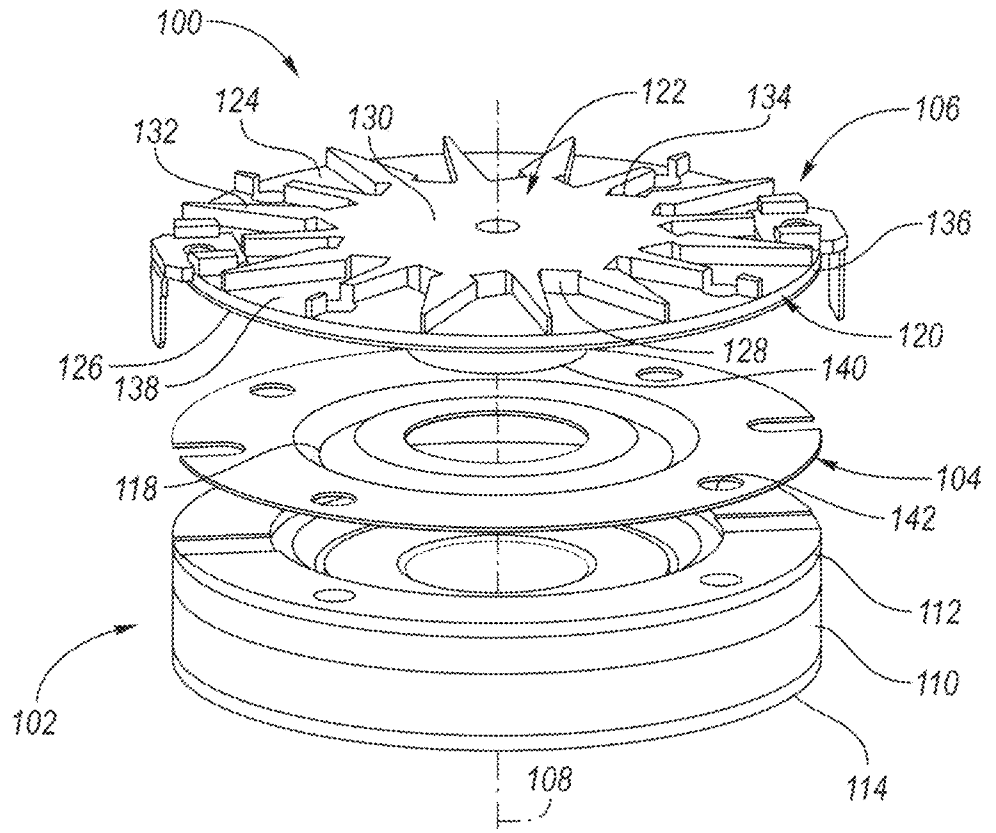
FIG. 1 is an exploded perspective view of a compression driver for use in an omnidirectional loudspeaker according to one or more embodiments.

With reference first to FIG. 1, an exploded perspective view of a compression driver 100 is illustrated which includes a magnet assembly 102, an annular flexural diaphragm 104, and a phasing plug 106 disposed coaxially along a central axis 108. In one or more embodiments, the magnet assembly 102 may comprise an annular permanent magnet 110 disposed between an annular top plate 112 and a back plate 114, although the magnet assembly 102 is not limited to this construction. As is known in the art, the magnet assembly 102 provides a permanent magnetic field for electrodynamic coupling with a voice coil (not shown), wherein the voice coil is coupled to the diaphragm 104 and produces movement of the flexible portion of the diaphragm 104.

There are two major types of compression drivers, the first utilizing a dome diaphragm and the other using an annular flexural diaphragm 104 as disclosed herein. One advantage of annular diaphragms is the smaller radial dimensions of the moving part of the diaphragm compared to dome diaphragms having the same diameter of the moving voice coil. In a compression driver, the diaphragm 104 is loaded by a compression chamber 116 (FIG. 6), which is a thin layer of air separating the diaphragm 104 from the phasing plug 106. The volume of air entrapped in the compression chamber 116 is characterized by an acoustical compliance which is proportional to the volume of compression chamber 116. The small radial dimension of the annular diaphragm 104 corresponds to the small radial dimensions of the matching compression chamber 116, which shifts undesirable air resonances (cross-modes) in the chamber to higher frequencies, sometimes above the audio range. Since the annular diaphragm 104 has two clamping perimeters, inside and outside of the moving part of the diaphragm 104, the annular diaphragm 104 has a better dynamic stability and it is less prone to the rocking modes compared to a dome diaphragm that has only external clamping. The diaphragm 104 may include a profiled section such as a V-shaped section 118, or may have other suitable configurations.

Figure 2:
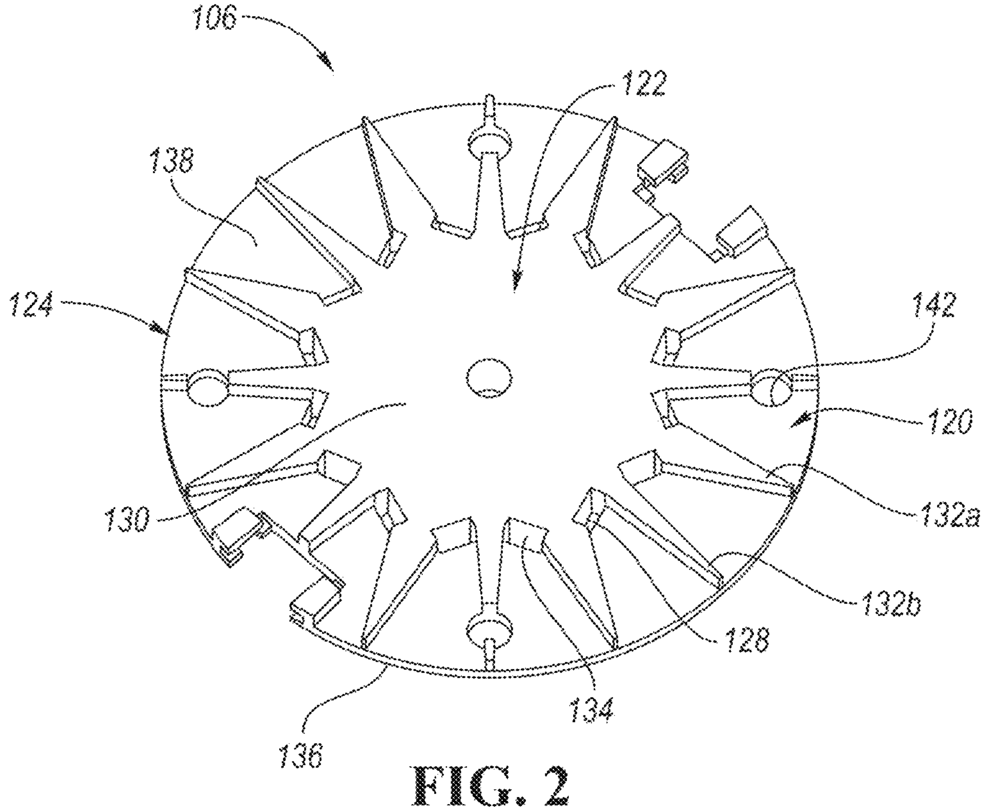
FIG. 2 is a perspective view of a phasing plug according to one or more embodiments.
Figure 3:
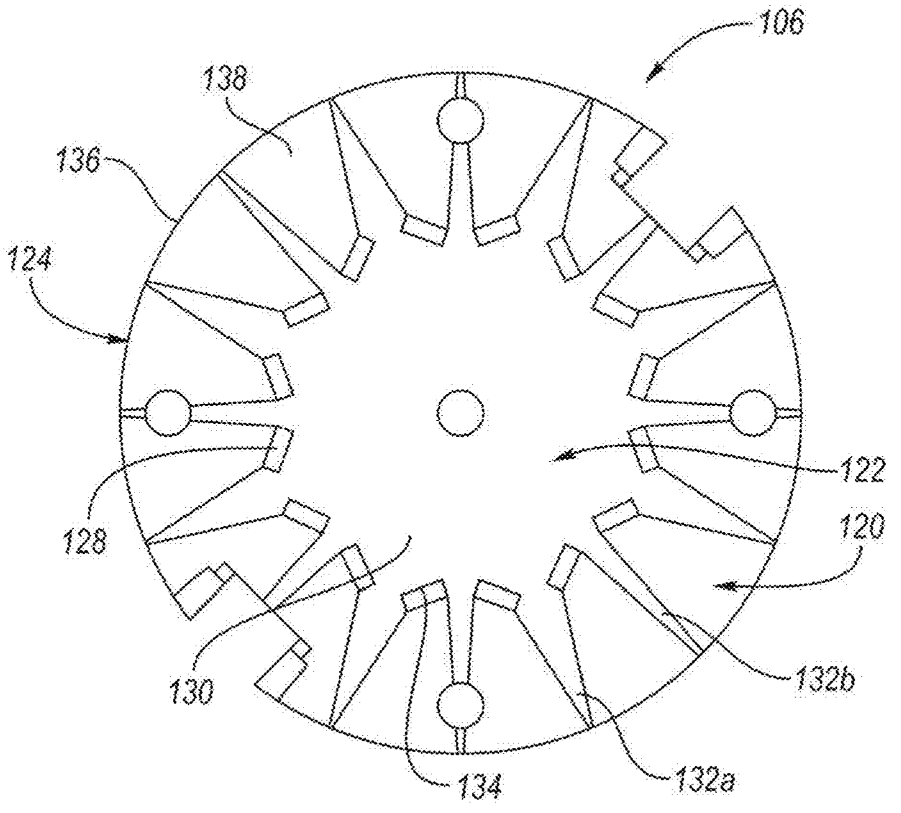
FIG. 3 is top view of the phasing plug of FIG. 2.
Figure 4:
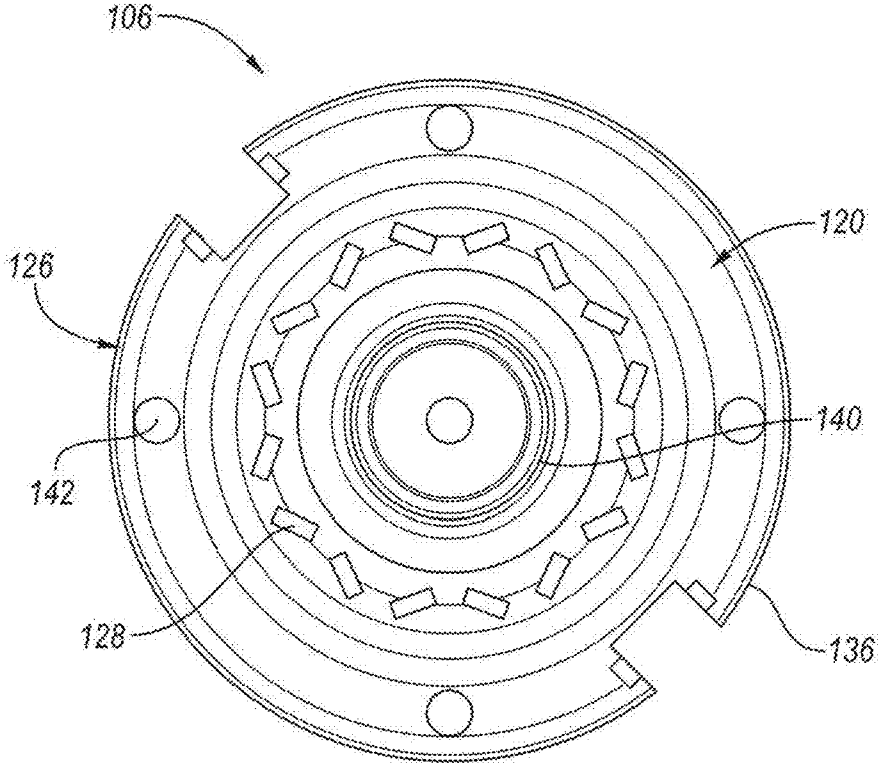
FIG. 4 is a bottom view of the phasing plug of FIG. 2.

With continuing reference to FIG. 1 as well as with reference to FIGS. 2-4, the phasing plug 106 includes a base portion 120 and a raised portion 122 extending upwardly from the base portion 120 and disposed generally symmetrically about the central axis 108. The raised portion 122 may have a generally constant height above the base portion 120, and the raised portion 122 may be integrally formed with the base portion 120 or may be attached to the base portion 122 by any suitable means. The base portion 120 may be generally circular or may have any other suitable geometry.

The base portion 120 includes a first side 124 (FIGS. 2-3) and an opposing second side 126 (FIG. 4) generally facing the diaphragm 104. The base portion 120 further includes one or more apertures 128 that extend as passages through the base portion 120 from the first side 124 to the second side 126 through which sound waves created by the diaphragm 104 may travel. In the embodiments depicted herein, the apertures 128 may be arranged generally circumferentially about the central axis 108, generally forming a circle with respect to a center of the phasing plug 106.

In the embodiment shown in FIGS. 1-4, the apertures 128 are configured as a plurality of diagonal slots. The slots are generally positioned end-to-end, such as in a “zig-zag” or sawtooth type pattern. Such a meandering pattern of axially-oriented slots may “smear” the resonance effects produced by a combination of mechanical and acoustical modes (resonances) in the compression chamber 116, providing averaging, randomization, and integration of sound pressure in the compression chamber 116 in such a way that the overall frequency response of the compression driver 100 becomes smoother. Instead of substantially linear or rectangular slots, the apertures 128 may include a plurality of curved slots, such as with the slots generally positioned end-to-end in a smoothed “zig-zag” or sinusoidal type pattern. Still further, a plurality of circular or square apertures 128 could be utilized, for example. It is understood that the apertures 128 are not limited to the embodiments depicted herein and may include other suitable shapes and configurations. For example, the plurality of slots could be uninterrupted so as to form a continuous sawtooth or sinusoidal arrangement of apertures 128. The configuration of apertures 128 described herein makes it possible to provide reflection-free propagation of sound waves from the compression chamber 116 to the exit of the compression driver 100.

In one or more embodiments, the raised portion 122 may have a central section 130 and a plurality of arms 132 extending outwardly therefrom. The apertures 128 may be disposed along or form an edge 134 of the central section 130, with an arm 132 extending between each adjacent pair of apertures 128. Said another way, an arm 132 may be disposed on each side of an aperture 128. In a top view, each arm 132 may be generally triangular in shape. In one or more embodiments, first arms 132*a* having a wider width along a circumferential direction of the phasing plug 106 may alternate with second arms 132*b* having a relatively narrower width along a circumferential direction of the phasing plug 106. With the triangular shape, the arms 132 are widest adjacent the edge 134 of the central section 130 and taper in width toward a perimeter 136 of the base portion 120. Of course, it is understood that the phasing plug 106 is not limited to the embodiments depicted herein, and that the base portion 120 and raised portion 122 may include other suitable shapes and configurations.

With reference to FIGS. 2 and 3, each aperture 128 is therefore acoustically connected to a corresponding radially-expanding channel 138 defined between each pair of adjacent arms 132 and the base portion 120. The radial channels 138 have expanding width and merge at the perimeter 136 of the base portion 120, and thus of the compression driver 100. The channels 138 may function to ensure even distribution of sound pressure around the entirety of the compression driver 100 for achieving omnidirectional radiation of sound. In addition to the embodiments depicted herein, it is also contemplated that the phasing plug 106 could include a lesser or greater number of channels 138, or alternatively could be configured without radially-expanding air channels.

As best shown in FIGS. 1 and 4, the phasing plug 106 may include a mounting member 140 on the second side 126 that depends downwardly from the base portion 120. The mounting member 140 may have any configuration suitable for coupling the phasing plug 106 to the magnet assembly 102 or to the rear section of the compression driver 100. In one embodiment, the mounting member 140 may be provided in the form of a cylinder. The magnet assembly 102, the diaphragm 104, and the phasing plug 106 may be connected together by fasteners through mounting apertures 142.

Figure 5:
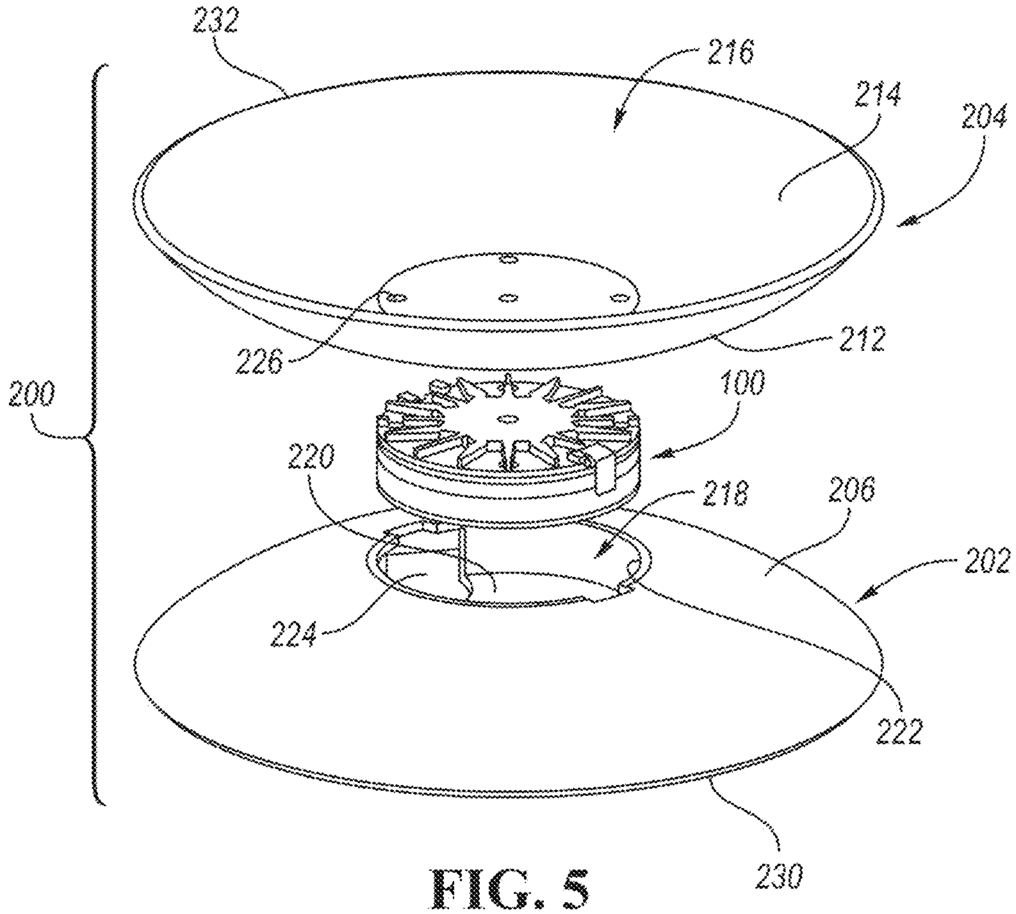
FIG. 5 is an exploded view of the omnidirectional loudspeaker including the compression driver and lower and upper horn members.

FIG. 5 is an exploded view of an omnidirectional loudspeaker 200 according to one more embodiments including the compression driver 100 and an exponential horn which includes a first or lower horn member 202 and a second or upper horn member 204. The lower horn member 202 may be generally bowl-shaped with a generally convex, upwardly-facing outer wall 206 and a generally concave, downwardly-facing inner wall 208 defining a lower cavity 210. Correspondingly, the upper horn member 204 may be generally bowl-shaped with a generally convex, downwardly-facing outer wall 212 and a generally concave, upwardly-facing inner wall 214 defining an upper cavity 216. Both the upper and lower horn members 202, 204 may be rotationally symmetric about the central axis 108.

At least one of the lower and upper horn members 202, 204 includes a recess 218 which may be generally cylindrical and sized to at least partially receive the compression driver 100. The recess 218 may be defined by a generally planar floor member 220 and an upstanding wall structure 222 connected to and at least partially surrounding the floor member 220, where the recess 218 includes an opening 224 adjacent the outer wall 206, 212 of the corresponding horn member 202, 204. The compression driver 100 may be disposed or mounted within the recess 218, such as by one or more fasteners engaging the floor member 220, for generating sound energy and directing it in an axial direction.

Figure 6:
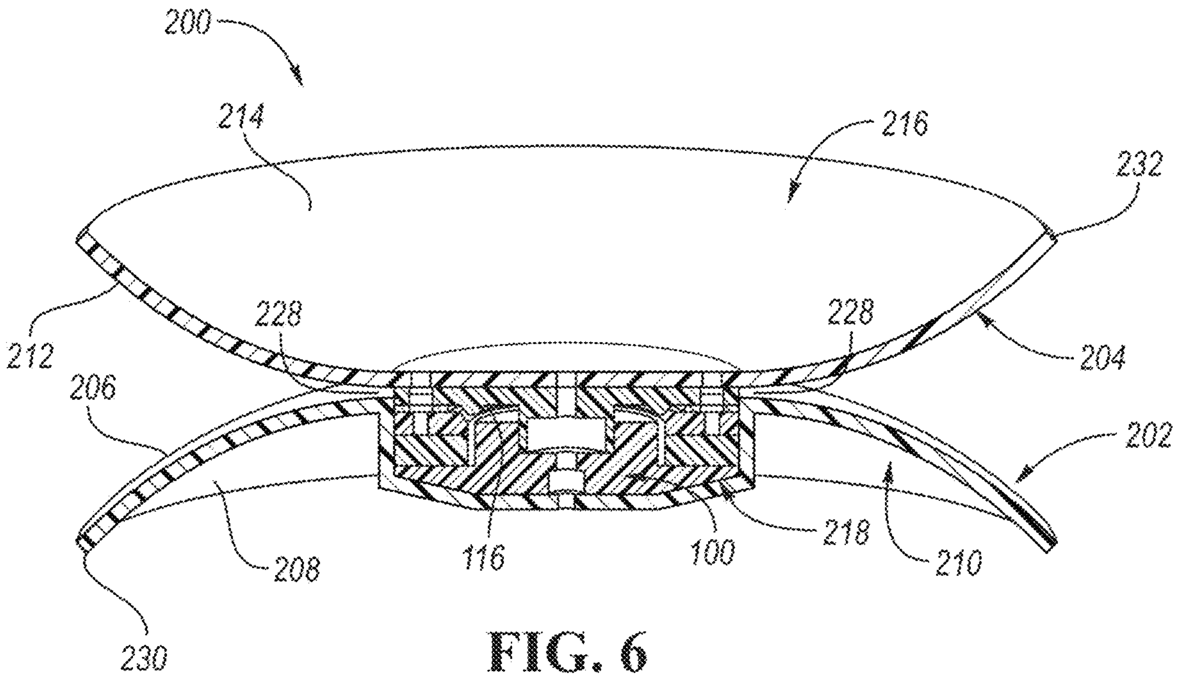
FIG. 6 is a cross-sectional view of an assembled omnidirectional loudspeaker according to one or more embodiments.

FIG. 6 is a cross-sectional view of the assembled omnidirectional loudspeaker 200 including the compression driver 100 and the lower and upper horn members 202, 204. In this instance where the compression driver 100 is received in the lower horn member 202, the upper horn member 204 is mounted on and secured to the compression driver 100 by fasteners, such as mounting screws, through assembly holes or apertures 226. Of course, if the compression driver 100 is received in the upper horn member 204, then the lower horn member 202 may be secured to the compression driver 100. When assembled, the compression driver 100 is generally centrally-located within the omnidirectional loudspeaker 200, and the lower and upper horn members 202, 204 are spaced apart, such as by the raised portion 122 of the phasing plug 106. The sound waves generated by the diaphragm 104 propagate through the apertures 128 into an annular waveguide that expands in the radial direction, the waveguide formed by the radially-expanding air channels 138 of the raised portion 122 of the phasing plug 106 and the outer walls 206, 212 of the lower and upper horn members 202, 204.

With continuing reference to FIG. 6, the compression chamber 116 is located in the space between the diaphragm 104 and the second side 126 of the phasing plug base portion 120. In practice, the height of the compression chamber 116 may be quite small (e.g., approximately 0.5 mm or less) such that the volume of the compression chamber 116 is also small. The actuation of the diaphragm 104 generates high sound-pressure acoustical signals within the compression chamber 116, and the signals travel as sound waves through the base portion 120 of the phasing plug 106 via the apertures 128 that provide passages from the second side 126 to the first side 124. With the apertures 128, the area of the entrance to the phasing plug 106 is significantly smaller than the area of the diaphragm 104. The air paths of the phasing plug 106 are essentially the beginning of the horn which functions to control directivity (i.e., coverage of sound pressure over a particular listening area) and to increase reproduced sound pressure level over a certain frequency range. The overall acoustical cross-sectional area of the air paths, including the apertures 128 and outwardly radiating channels 138, in the phasing plug 106 and then of the horn members 202, 204 gradually increase to provide a smooth transition of sound waves. From the apertures 128, the sound waves radiate outward along the radially-expanding channels 138, through the passageway 228 between the compression driver 100 and the horn members 202, 204, and propagate omnidirectionally into the ambient environment.

The lower horn member 202 limits the propagation of sound energy in a first axial direction (i.e., downwardly), and the upper horn member 204 limits the propagation of sound energy in a second axial direction (i.e., upwardly). The lower and upper horn members 202, 204 thus provide acoustical loading for the compression driver 100 and control of the directivity in the vertical plane. In combination, the lower and upper horn members 202, 204 define a passageway 228 therebetween to direct the flow of sound energy radially, where the acts like a radial horn providing omnidirectional coverage, extending 360° about the central axis 108 to direct the flow of sound energy generated by the compression driver 100 to radiate 360° outwardly horizontally in all directions.

Of course, it is understood that directional identifiers such as upper and lower and upwardly and downwardly used herein are not intended to be limiting, and are simply used to provide an exemplary environment for the components of the omnidirectional loudspeaker 200 as disclosed herein.

Figure 7:
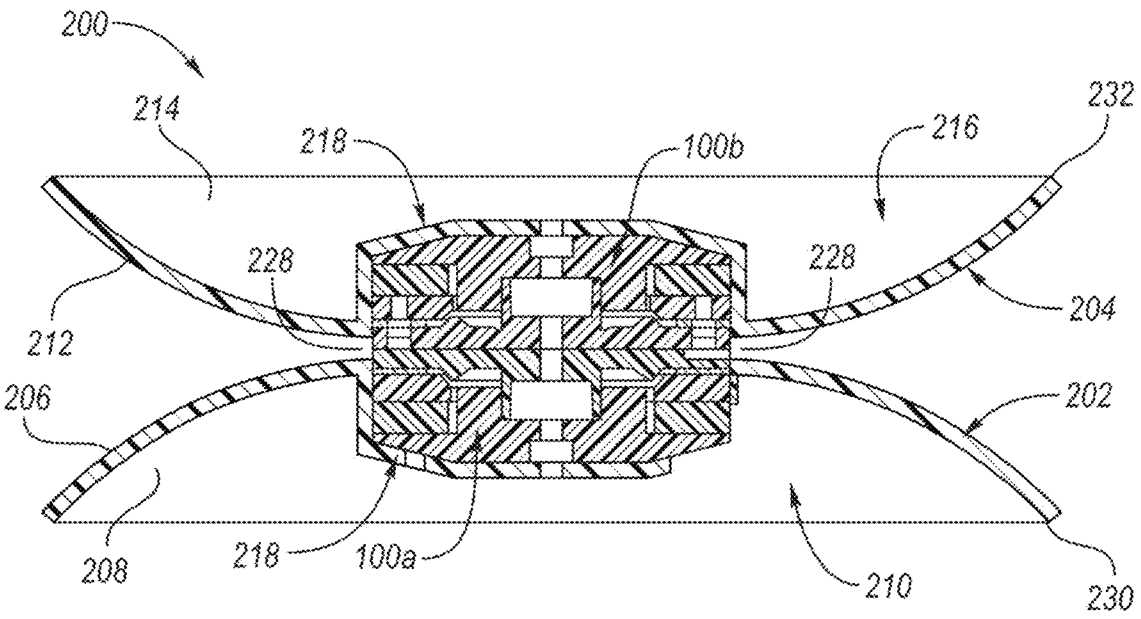
FIG. 7 is a cross-sectional view of an omnidirectional loudspeaker having dual compression drivers.

FIG. 7 is a cross-sectional view of an embodiment of the omnidirectional loudspeaker 200 which includes dual compression drivers 100. As shown, a first compression driver *100a* is disposed within the lower horn member 202 and a second compression driver *100b* is disposed within the upper horn member 204 in an opposed axial orientation, where the first and second compression drivers *100a*, *100b* are secured to each other. As such, the first compression driver *100a* generates sound in a first axial direction and the second compression driver *100b* generates sound in a second or opposite axial direction. This configuration further increases the sound pressure output and maximum sound pressure level of the omnidirectional loudspeaker 200, where the compression drivers *100a*, *100b* are vertically arranged in a very compact space in opposing recesses 218.

Figure 8:
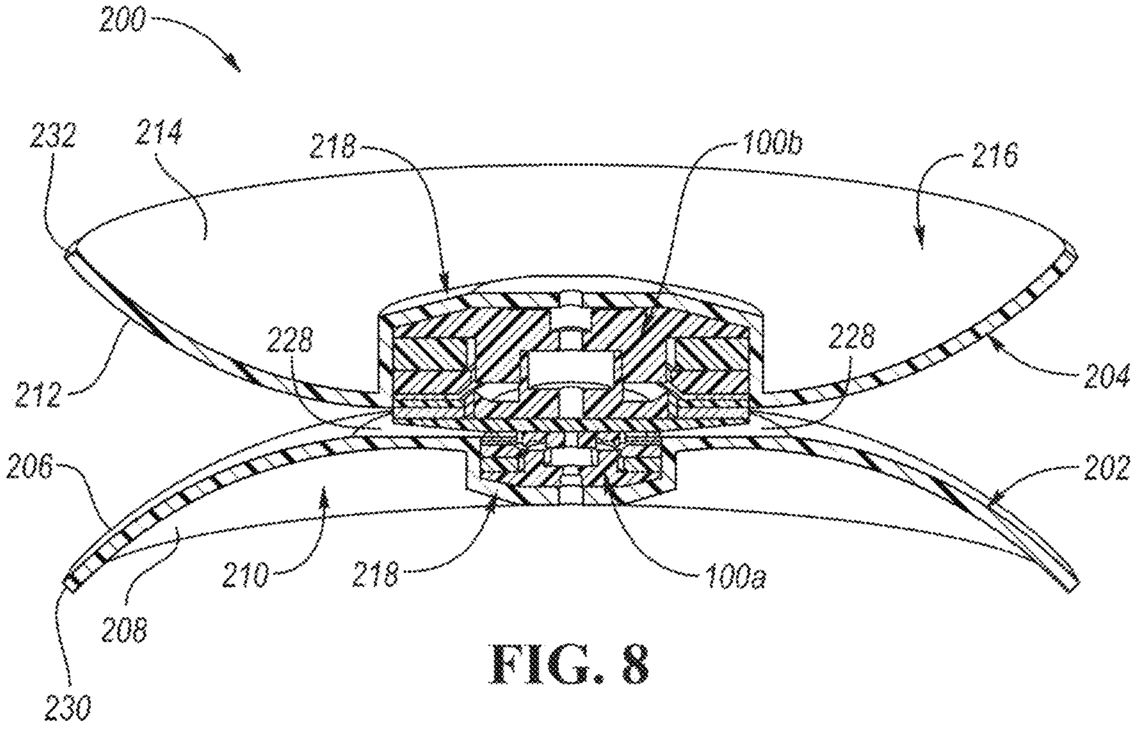
FIG. 8 is a cross-sectional view of an omnidirectional loudspeaker including opposing drivers of different frequency outputs.

FIG. 8 is a cross-sectional view of an embodiment of the omnidirectional loudspeaker 200 with compression drivers *100a*, *100b* of different sizes and frequency ranges. In the example shown, a high frequency driver *100a* is disposed within the lower horn member 202 and a midrange driver *100b* is disposed within the upper horn member 204, although the omnidirectional loudspeaker 200 is not limited to this type and placement of drivers *100a*, *100b*. Again, the compression drivers *100a*, *100b* are vertically arranged in a very compact space in opposing recesses 218 and their output is blended, where the drivers *100a*, *100b* can be secured directly to one another or both joined to an intermediate plate 230. In this configuration, two compression drivers *100a*, *100b* having different-sized voice coils and diaphragms can be coupled such that a summation of the signals is provided at the exits of the phasing plugs 106, and the outputs of both drivers 100*a*, 100*b* pass through the passageway 228 formed between the horn members 202, 204 and are then uniformly radiated in the horizontal plane for uniform sound distribution in a 360° pattern. As such, the omnidirectional loudspeaker 200 functions as a two-way system, and therefore its frequency range is expanded.

Figure 9:
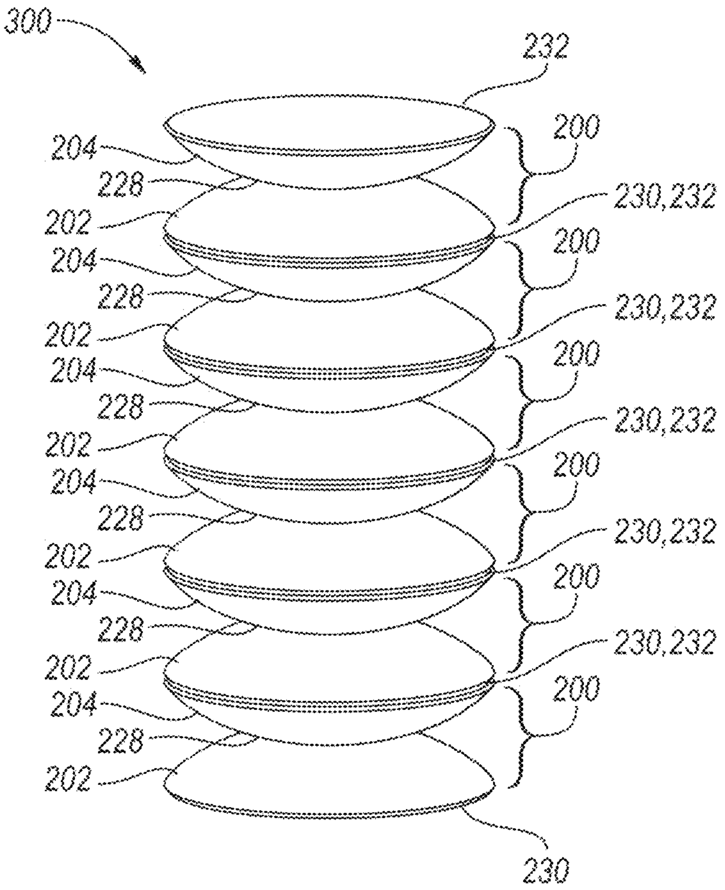
FIG. 9 illustrates a speaker array of omnidirectional loudspeakers according to one or more embodiments.

Each omnidirectional loudspeaker 200 is suitable as a stand-alone acoustical unit but, if a system of higher sound pressure level output is desired, a plurality of omnidirectional loudspeakers 200 may be assembled or vertically stacked in modular fashion, one above the other, to form an omnidirectional speaker array 300 as illustrated in FIG. 9. The lower and upper horn members 202, 204 each have a generally circular circumferential edge 232, 234 surrounding the cavity 210, 216, such that adjacent horn members 202, 204 may be connected, such as via fasteners or adhesive, at their respective circumferential edges 232, 234 to form the speaker array 300. The modularity of the omnidirectional loudspeaker 200 disclosed herein advantageously allows for the construction of loudspeaker systems having a wide range of potential intensities by assembling an appropriate number of loudspeaker units 200, each having the same size, engagement and mounting surfaces, and fastening structures.

Figure 10:
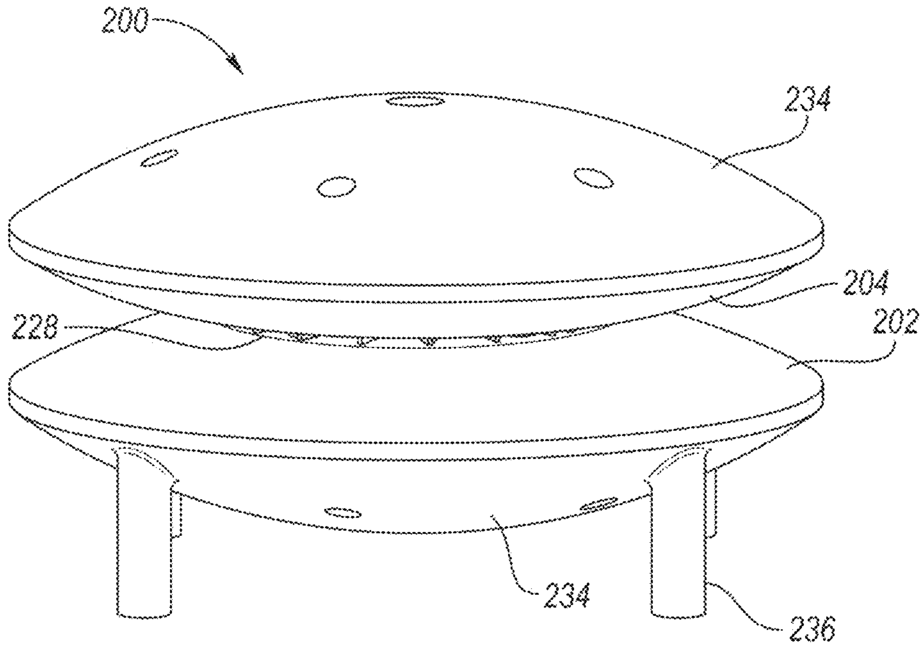
FIG. 10 illustrates an omnidirectional loudspeaker with covers and a support stand.

The ends of the speaker array 300 can be left open as illustrated in FIG. 9, or the lower and upper cavities 210, 216 of the end lower and upper horn members 202, 204, respectively, may each be enclosed with a cover 236 as shown in FIG. 10. In one or more embodiments, the cover 236 may be generally bowl-shaped and may correspond to the size and shape of the horn members 202, 204. In other embodiments, the cover 236 may be generally spherical or conical, for example, or have other configures which would all provide slightly different acoustical behavior from the standpoint of diffraction.

Figure 11:
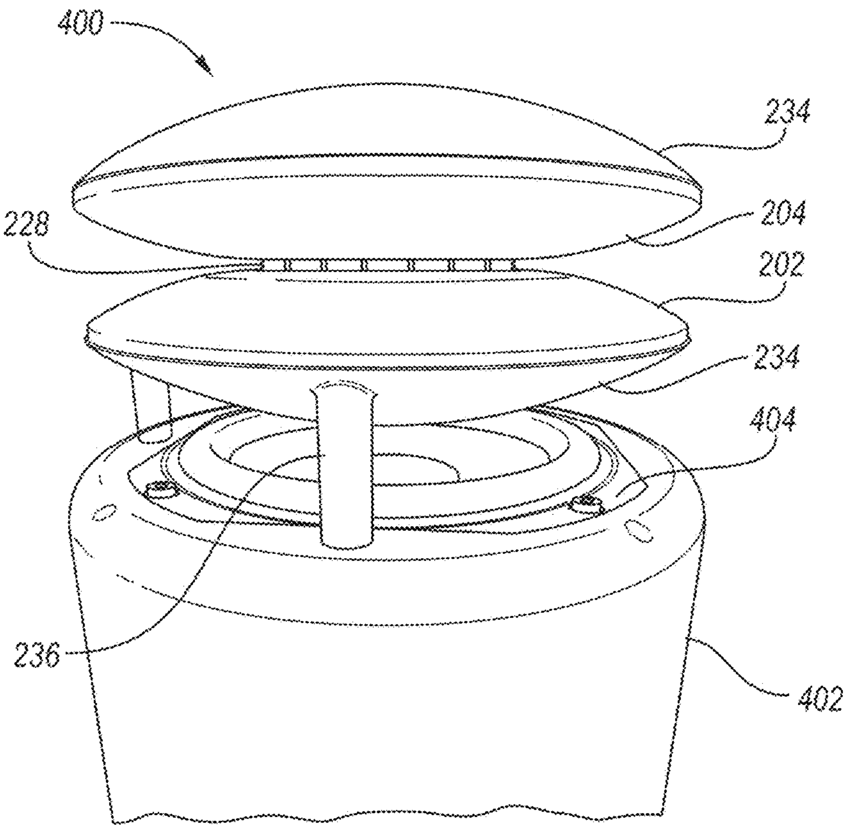
FIG. 11 is a perspective view of a loudspeaker assembly with an omnidirectional loudspeaker mounted on an enclosure housing a woofer.

FIG. 10 depicts an omnidirectional loudspeaker 200 with covers 236 enclosing the lower and upper horn members 202, 204. As shown, a support stand 238, which may include support legs, can be mounted or integrally formed with the lower cover 236 for supporting the omnidirectional loudspeaker 200 or speaker array 300 on a surface. FIG. 11 is a perspective view of a loudspeaker assembly 400 which includes an omnidirectional loudspeaker 200 (such as the configuration shown in FIG. 10) mounted on an enclosure 402 including a woofer 404, for example.

Figure 12:
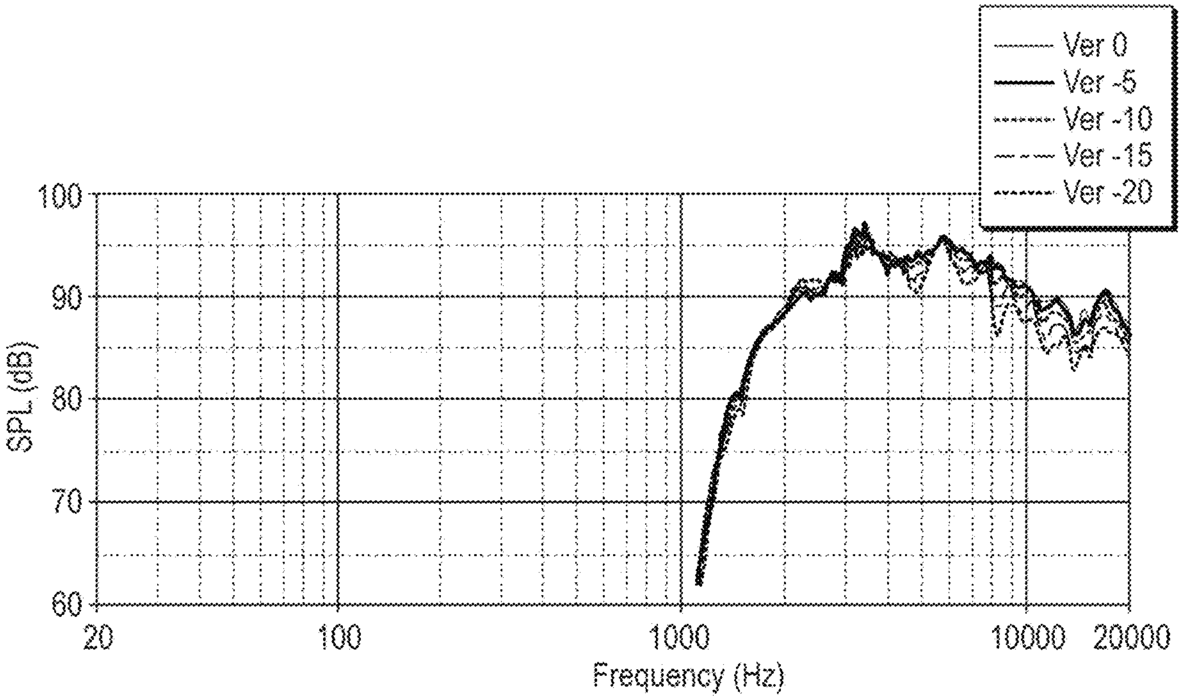
FIG. 12 is a graph of directivity response of the omnidirectional loudspeaker in the vertical plane.

FIG. 12 is a graph of directivity response of the omnidirectional loudspeaker 200 and incorporated compression driver 100 in the vertical plane, the compression driver 100 including a 1.5" diameter voice coil and polymer flexural annular diaphragm 104. The axisymmetric horn created by the lower and upper horn members 202, 204 provides acoustical loading equivalent to that of an exponential horn.

Applications for the compression driver 100, omnidirectional loudspeaker 200 and speaker array 300 described herein include, but are not limited to, landscape sound systems, Hi-Fi systems, home lifestyle loudspeaker systems, public address systems, alarm and warning sound systems, portable audio Bluetooth-based loudspeakers, high-powered pendant speakers, negative directivity ceiling speakers, or other applications where omnidirectionality is desired or required. Compared with direct-radiating dome speakers, use of the compression driver 100 in the omnidirectional loudspeaker 200 disclosed herein results in a ten-fold increase in efficiency and sensitivity, as well as an increase in maximum sound pressure level. The compression driver 100 and omnidirectional loudspeaker 200 provide uniform sound radiation at all frequencies over a full 360° coverage area, are easily scalable for different sizes of voice coils and diaphragms, and provide a modular system for the construction of customized speaker arrays.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A compression driver for an omnidirectional loudspeaker, the compression driver comprising:

a magnet assembly disposed about a central axis;

an annular diaphragm disposed coaxially above and operably connected to the magnet assembly;

a phasing plug including a base portion having a first side and an opposed second side facing the diaphragm, the base portion including a plurality of apertures that extend therethrough and are arranged generally circumferentially about the central axis, the phasing plug including a raised portion extending upwardly from the base portion and defining a plurality of radially-expanding channels acoustically connected to the apertures; and a compression chamber defined between the diaphragm and the phasing plug, wherein actuation of the diaphragm by the magnet assembly generates sound waves within the compression chamber which travel through the plurality of apertures and the radially-expanding channels to create a generally horizontal 360° radiation pattern of the sound waves from the compression driver.

2. The compression driver of claim 1, wherein the raised portion has a generally constant height above the base portion.

3. The compression driver of claim 1, wherein the raised portion has a central section and a plurality of arms extending outwardly therefrom, wherein a pair of adjacent arms defines one of the plurality of radially-expanding channels therebetween.

4. The compression driver of claim 3, wherein the apertures are disposed along an edge of the central section, with an arm disposed on each side of each aperture.

5. The compression driver of claim 4, wherein each arm is generally triangular in shape and is widest adjacent the edge of the central section and tapers in width toward a perimeter of the base portion.

6. The compression driver of claim 3, wherein the arms include first arms having a wider width along a circumferential direction of the phasing plug alternating with second arms having a relatively narrower width along the circumferential direction of the phasing plug.

7. The compression driver of claim 1, wherein the plurality of apertures includes a plurality of diagonal slots positioned end-to-end.

8. A compression driver for an omnidirectional loudspeaker, the compression driver comprising:

a magnet assembly disposed about a central axis;

an annular diaphragm disposed coaxially above and operably connected to the magnet assembly;

a phasing plug including a generally planar base portion having a first side and an opposed second side facing the diaphragm, the base portion including a plurality of apertures that extend therethrough and are arranged generally circumferentially about the central axis, the phasing plug including a raised portion extending upwardly from the base portion and defining a plurality of radially-expanding channels acoustically connected to the apertures; and a compression chamber defined between the diaphragm and the phasing plug, wherein actuation of the diaphragm by the magnet assembly generates sound waves within the compression chamber which travel through the plurality of apertures and the radially-expanding channels to create a generally horizontal 360° radiation pattern of the sound waves from the compression driver.

9. The compression driver of claim 8, wherein the raised portion has a generally constant height above the base portion.

10. The compression driver of claim 8, wherein the raised portion has a central section and a plurality of arms extending outwardly therefrom, wherein a pair of adjacent arms defines one of the plurality of radially-expanding channels therebetween.

11. The compression driver of claim 10, wherein the apertures are disposed along an edge of the central section, with an arm disposed on each side of each aperture.

12. The compression driver of claim 11, wherein each arm is generally triangular in shape and is widest adjacent the edge of the central section and tapers in width toward a perimeter of the base portion.

13. The compression driver of claim 10, wherein the arms include first arms having a wider width along a circumferential direction of the phasing plug alternating with second arms having a relatively narrower width along the circumferential direction of the phasing plug.

14. The compression driver of claim 8, wherein the plurality of apertures includes a plurality of diagonal slots positioned end-to-end.

15. A compression driver for an omnidirectional loudspeaker, the compression driver comprising:

a magnet assembly disposed about a central axis;

an annular diaphragm disposed coaxially above and operably connected to the magnet assembly;

a phasing plug including a base portion having a first side and an opposed second side facing the diaphragm, the base portion including a plurality of apertures that extend therethrough and are arranged generally circumferentially about the central axis, the phasing plug including a raised portion extending upwardly from the base portion and defining a plurality of radially-expanding channels acoustically connected to the apertures, wherein the raised portion has a central section and a plurality of arms extending outwardly therefrom, each arm having a constant height, wherein a pair of adjacent arms defines one of the plurality of radially-expanding channels therebetween; and a compression chamber defined between the diaphragm and the phasing plug, wherein actuation of the diaphragm by the magnet assembly generates sound waves within the compression chamber which travel through the plurality of apertures and the radially-expanding channels to create a generally horizontal 360° radiation pattern of the sound waves from the compression driver.

16. The compression driver of claim 15, wherein the raised portion has a central section and a plurality of arms extending outwardly therefrom, wherein a pair of adjacent arms defines one of the plurality of radially-expanding channels therebetween.

17. The compression driver of claim 16, wherein the apertures are disposed along an edge of the central section, with an arm disposed on each side of each aperture.

18. The compression driver of claim 17, wherein each arm is generally triangular in shape and is widest adjacent the edge of the central section and tapers in width toward a perimeter of the base portion.

19. The compression driver of claim 16, wherein the arms include first arms having a wider width along a circumferential direction of the phasing plug alternating with second arms having a relatively narrower width along the circumferential direction of the phasing plug.

20. The compression driver of claim 15, wherein the plurality of apertures includes a plurality of diagonal slots positioned end-to-end.

* * * * *